United States Patent
Yoon (10) Patent No.: US 11,481,145 B2
(45) Date of Patent: Oct. 25, 2022

(54) DYNAMICALLY THROTTLING HOST WRITE DATA RATE

(71) Applicant: PetaIO Inc., Santa Clara, CA (US)

(72) Inventor: Jongman Yoon, San Jose, CA (US)

(73) Assignee: PETAIO INC., Santa Clara, CA (US)

( * ) Notice: Subject to any disclaimer, the term of this patent is extended or adjusted under 35 U.S.C. 154(b) by 0 days.

(21) Appl. No.: 17/185,212

(22) Filed: Feb. 25, 2021

(65) Prior Publication Data

US 2022/0269435 A1 Aug. 25, 2022

(51) Int. Cl.
*G06F 3/06* (2006.01)

(52) U.S. Cl.
CPC .......... *G06F 3/0656* (2013.01); *G06F 3/0613* (2013.01); *G06F 3/0653* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,271,692 B1* | 9/2012 | Dinh | ................ | G06F 3/0676 702/56 |
| 9,274,966 B1* | 3/2016 | Chahwan | .............. | G06F 3/0656 |
| 10,877,667 B2* | 12/2020 | Karia | .................. | G06F 11/3433 |
| 2005/0071550 A1* | 3/2005 | Lowe | .................... | G06F 3/0673 711/170 |
| 2012/0047318 A1* | 2/2012 | Yoon | ...................... | G06F 3/0613 711/E12.008 |
| 2013/0007380 A1* | 1/2013 | Seekins | ................. | G06F 3/0616 711/E12.001 |
| 2016/0313921 A1* | 10/2016 | Kojima | ............... | G06F 12/0246 |
| 2017/0160953 A1* | 6/2017 | Hirata | .................. | G06F 3/0679 |
| 2017/0177262 A1* | 6/2017 | Sharma | ................. | G06F 3/0653 |
| 2017/0285945 A1* | 10/2017 | Kryvaltsevich | ....... | G06F 3/0679 |
| 2018/0173464 A1* | 6/2018 | Wongso | ............... | G06F 3/0614 |
| 2018/0260136 A1* | 9/2018 | Huo | ....................... | G06F 3/0685 |
| 2019/0220201 A1* | 7/2019 | Jia | ........................ | G06F 12/0871 |
| 2020/0333975 A1* | 10/2020 | Benisty | ................ | G06F 3/0659 |
| 2021/0081115 A1* | 3/2021 | Clarke | ................. | G06F 3/0659 |
| 2021/0081135 A1* | 3/2021 | Troy | ..................... | G06F 3/0655 |
| 2021/0240384 A1* | 8/2021 | Kryvaltsevich | ..... | G06F 13/1689 |

* cited by examiner

*Primary Examiner* — Kevin Verbrugge
(74) *Attorney, Agent, or Firm* — Stevens Law Group; David R. Stevens (57) ABSTRACT

The present invention extends to methods, systems, and computer program products for dynamically throttling host write data rates, for example, at SSDs. Host write data is received from a host at a host write data rate. The host write data is buffered in an SSD buffer at the host write data rate. Some host write data is transferred from the SSD buffer to NAND storage at an internal NAND data rate. A host write throttle is calculated at least based on the host data rate and the internal NAND data rate. The host write throttle defines a new (e.g., increased or decreased) host write data rate. The host write throttle is sent to the host requesting the host utilize the new host write data rate. When a new host write data rate is decreased, data transfer from SSD buffer to NAND storage can be allowed to "catch up".

22 Claims, 7 Drawing Sheets

DYNAMICALLY THROTTLING HOST WRITE DATA RATE

TECHNICAL FIELD

The present disclosure relates generally to storage devices. Aspects include dynamically throttling host write data rates.

BACKGROUND

A sold-state drive (SSD) is a type of storage device that can be included in a computer system. Using any of a variety of host interfaces, a host computer system can write data to the SSD for storage and read previously stored data from the SSD.

Typically, when a host system issues a write command to an SSD, the SSD fetches that command and then starts to transfer host write data associated with the write command into the SSD. At the SSD, host write data can be transferred from the host system into an internal memory buffer and then from the memory buffer into NAND storage (non-volatile memory). When all write data is transferred to the internal memory buffer, the write command is considered done even if all the write data has not yet been written to NAND storage.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for dynamically throttling a host write data rate, for example, at Solid-State Drives A Solid-State Drive (SSD) can include front-end host interface that accepts host write data from a host computer system and aggregates the host write data in a buffer. In the background within the SSD, a back-end NAND interface can then transfer host write data from the buffer to NAND storage.

In one aspect, the speed of transferring write data via a front-end host interface into the buffer is faster than the back-end NAND interface speed of transferring the host write data to NAND storage (e.g., faster than the speed of NAND programming in SSD NAND dies). Due to the throughput discrepancy between front-end host interface and back-end NAND interface, write performance fluctuations can occur. When the buffer has sufficient capacity (e.g., is empty), write data can buffered and transferred to NAND storage. Front end host interfaces can include (e.g., Non-Volatile Memory Express (NVMe), Serial AT Attachment (SATA), Small Computer System Interface (SCSI), etc.

Over time, NAND storage can become busy programming host write data and cannot take additional host data. The buffer can become full and turns on a "full status". In response, the SSD eventually pauses outstanding host write commands until NAND storage resources are released. When NAND storage resources are freed up, host write commands can run again. These "start/stop" cycles can maximize host write throughput by utilizing any chance of write transferring. However, "start/stop" cycles also cause (possibly significant) fluctuations in write performance. Due to write performance fluctuations some portions of write data can experience increased latency. The increased latency may be undesirable in some environments, for example, when attempting to maintain a specified write Quality of Service (QoS).

Figure 9:
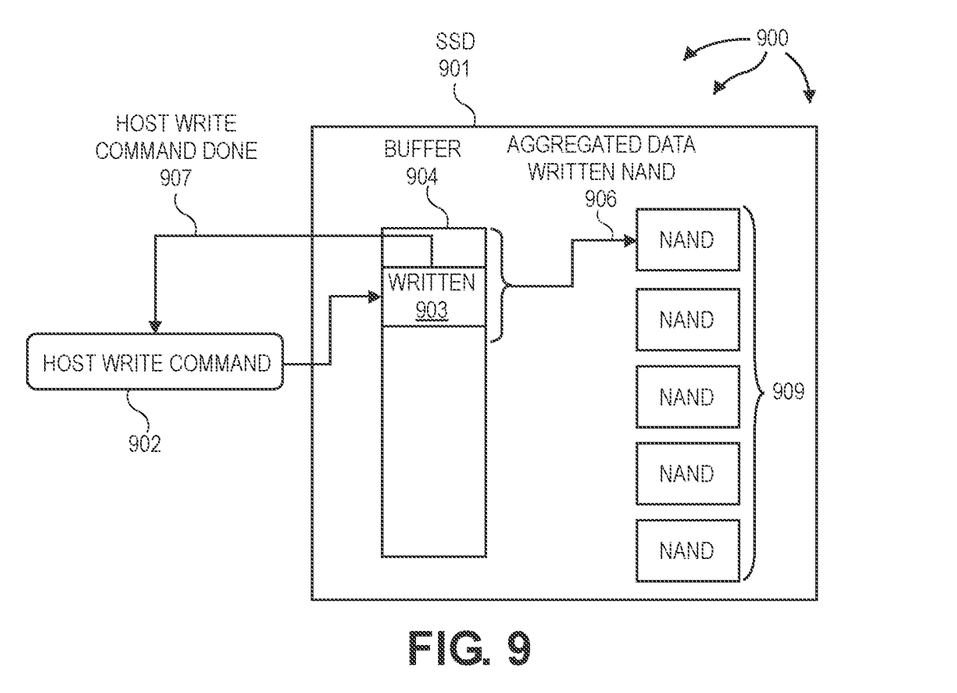
FIG. 9 illustrates an example computer architecture that facilitates storing data at a solid-state drive (SSD).

Turning briefly to FIG. 9, FIG. 9 illustrates an example computer architecture 900 that facilitates storing data at SSD 901. SSD 901 can receive host write command 902 from a host (computer) system. Host write data associated with host write command 902 can be written 903 to (e.g., aggregated in) buffer 904 (e.g., RAM). When the host write data is fully aggregated into buffer 904, SSD 901 can send host write command done 907 back to the host system. Then, through internal background operations, aggregated data can be written 906 from buffer 904 to NAND storage 909 (non-volatile memory).

Host write command 902 can be executed relatively quickly with low latency when buffer 904 has capacity to store host write data. However, when buffer 904 is at or near capacity (and cannot accept additional host write data), host write performance can drop significant (potentially down to zero). Buffer 904 can fill to capacity due to any number of reasons. In one aspect, NAND write processing 906 (i.e., transfer of write data from buffer 904 to NAND storage 909) is slower than host write command processing (i.e., receiving write data and buffering the write data 903 in buffer 904). At a threshold data load, NAND storage 909 cannot accommodate further write data resulting in buffer 904 becoming full.

In response, SSD 901 cannot get the host write data. Furthermore, due to the write buffer full, SSD 901 temporarily stops triggering write HDMA transfer. Additionally, SSD 901 can send a "write buffer full" message back to the host system. The host system can in turn temporarily stop sending host write data. Thus, a full buffer 904 can place current write processing on hold for some amount time, for example, until NAND write processing 906 is able to catch up. As such, host write performance fluctuates and some write commands can have (e.g., possibly significant) longer latency.

As described, the "start/stop" approach may be more appropriate to maximize average write throughput when performance fluctuations are of decreased concern. For example, write command processing can operate at full speed and then, in response to back-end pressure on NAND write processing 906, write command processing can stop. In this way, a host system and SSD 901 can interoperate to more fully utilize possibilities of transferring data. However, the "start/stop" approach may be less appropriate (or even undesirable) when performance fluctuations are of increased concern, such as, for example, when a specified Write Quality of Service (QoS) is desired at SSD 901.

Accordingly, aspects of the invention can throttle host write traffic speed. In one particular aspect, host write traffic speed is throttled down to equal to or less than NAND write throughput. Advantageously, since host write traffic is slowed (vs being stopped), performance fluctuation (and corresponding latency) magnitude and duration can be (potentially significantly) mitigated. In turn, write QoS can be improved.

In some aspects, tradeoffs between average host write throughput, write QoS, and performance fluctuation are considered and/or balanced when throttling host write traffic speed. As such, Write QoS can be better controlled while limiting host write throughput degradation (slowing). For example, a dynamic write throttle can minimize average write throughput degradation, mitigate write performance fluctuation, and contain write command latency for Write QoS handling.

As described, an SSD can include a front-end host interface and a back-end NAND interface. The front-end host interface can utilize a standard or proprietary protocol, such as, NVMe, SCSI, SATA, and etc. protocols to receive host write data. Within an SSD, processes in addition to moving buffered host write data to NAND storage can also consume back-end throughput. For example, garbage collection, error handling, data recovery, encryption/decryption, defect management, etc., can consume back-end throughput. As such, maximum back-end throughput may not be assignable for moving buffered host write data to NAND storage. Instead, back-end throughput available to handling buffered host write data can change over time in view of other back-end operations.

An SSD back-end can include a software layer, for example a Flash Translation Layer (FTL) that manages and schedules flow control of read/write data and associations to NAND storage locations. The software layer (hereinafter referred to as an "FTL") can control NAND traffic and manage back-end resource allocation. The FTL can also control a host write throttle of a front-end host interface. The FTL can determine a ratio of available back-end write throughput to host write traffic and other operations and derive a host write throttle based on the ratio. Thus, the FTL can dynamically throttle host write throughput in response to changes in SSD back-end operation (e.g., other back-end operations consuming varied amounts of back-end throughput and/or resources at different times).

Figure 6:
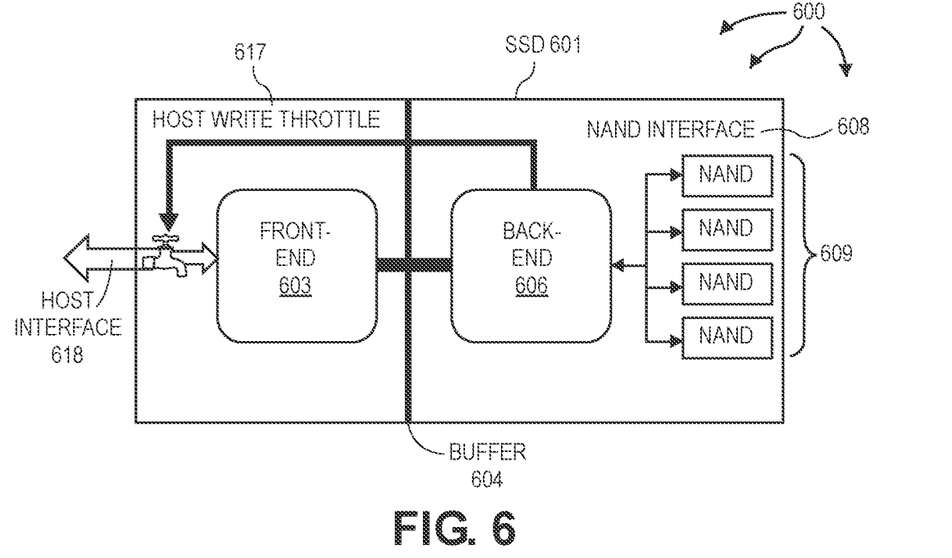
FIG. 6 illustrates a further example computer architecture that facilitates dynamically throttling a host write data rate.

Turning to FIG. 6, FIG. 6 illustrates an example computer architecture 600 that facilitates dynamically throttling a host write data rate at SSD 601. Front-end 603 can receive host write data from a host system via host interface 618. Host write data can be buffered in buffer 604. Back-end 606 (e.g., an FTL) can utilize NAND interface 608 to transfer data from buffer 604 to NAND storage 609. Back-end 606 can also determine a ratio of available back-end write throughput to host write traffic being received at host interface 618 and other back-end operations at SSD 601. Back-end 606 can derive host write throttle 617 from the ratio.

Front-end 603 can send host write throttle 617 to the host system via host interface 618. Host write throttle 617 can instruct the host system to send host write traffic at a different (e.g., reduced) rate. The host system can respond by sending additional host write traffic at the different rate. Back-end 606 can derive additional host write throttles on an on-going basis, periodically, at specific times, as available back-end throughput changes, etc. As such, host throttling can be dynamically adjusted (including increased or decreased) over time and as back-end operations change.

Host throttling can be inversely related to data rate/throughput. Increased throttling can correspond to reduced host data rate/throughput. On the other hand, decreased throttling can correspond to increased host data rate/throughput.

Some SSDs can include multiple FTLs. Each FTL can be assigned to a portion of NAND storage to increase parallelism of NAND operations (e.g., implementing data striping). It may be that each FTL derives an appropriate write throttle based on known back-end throughput and other back-end operation information. Each FTL may have different back-end throughput relative to its assigned portion of NAND storage. Each FTL may also be aware of different and varied information associated with back-end operations. As such, host write throttles derived by different FTLs can differ from one another.

Synchronization among FTLs is not always possible. Based on back-end operational circumstances, back-end throughput for transferring buffered host write data to NAND storage can vary across FTLs. FTLs having reduced back-end throughput can bottleneck an SSD and limit the maximum host write throughput. For example, other FTLs can slow down to the speed of slowest FTL. As such, a host write throttle from the slowest FTL can be selected to send to the host system. Other faster FTLs have enough room to manage write performance fluctuation and Write QoS from slowing down of host write traffic.

Host write throttles from each FTL can be compared to one another (e.g., periodically, at specified times, etc.). The host write throttle reducing host write data throughput the most can be selected. Thus, an SSD can both contain write QoS and mitigate write performance fluctuation.

Figure 7:
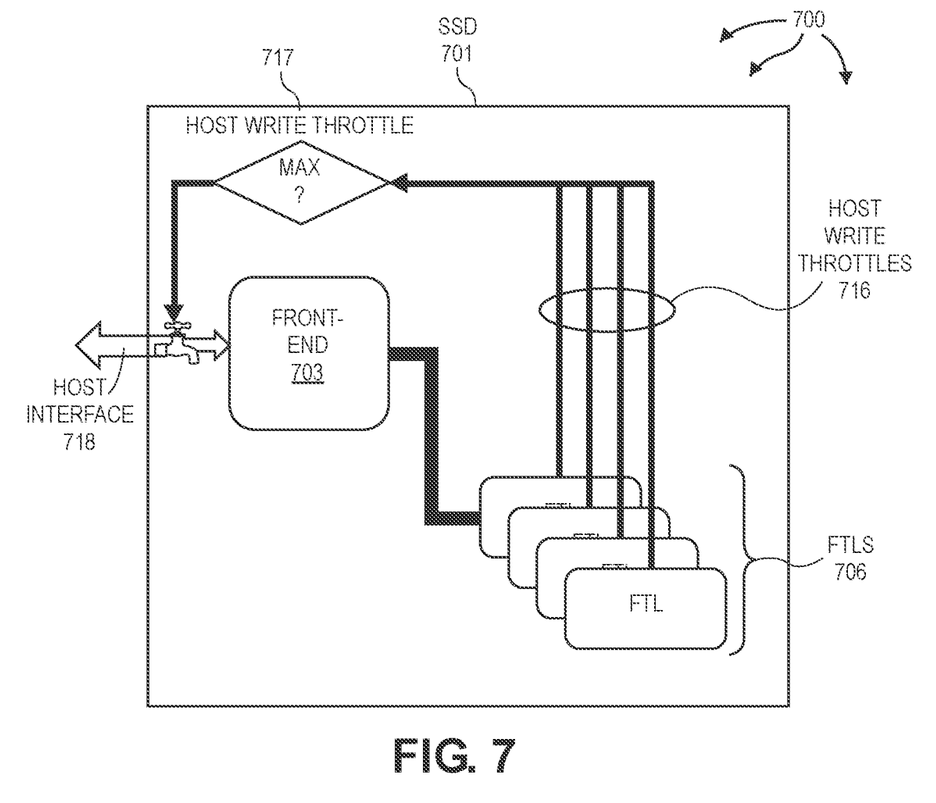
FIG. 7 illustrates an additional example computer architecture that facilitates dynamically throttling a host write data rate.

Turning to FIG. 7, FIG. 7 illustrates an additional example simplified computer architecture that facilitates dynamically throttling a host write data rate at SSD 701. Front-end 703 can receive host write data from a host via host interface 718. Host write data can be buffered in a buffer. Each of FTLs 706 can utilize a NAND interface to transfer data from the buffer to an assigned portion of NAND storage. Each FTL 706 can also determine a ratio of available back-end write throughput to host write traffic and other back-end operations at SSD 601 based on information known to the FTL 706. Each FTL 706 can derive a host write throttle 716 from a corresponding ratio. Among host write throttles 716, host write throttle 717 can be selected as the host write throttle reducing host write data throughput the most.

Front-end 703 can send host write throttle 717 to the host via host interface 718. Host write throttle 717 can instruct the host to send host write traffic at a different (e.g., reduced) rate. The host can respond by sending additional host write traffic at the different rate. FTLs 706 can derive additional host write throttles on an on-going basis, periodically, at specific times, available back-end throughput changes, etc. As such, host throttling can be dynamically adjusted (including increased or decreased) over time and as back-end operations change.

Figure 8:
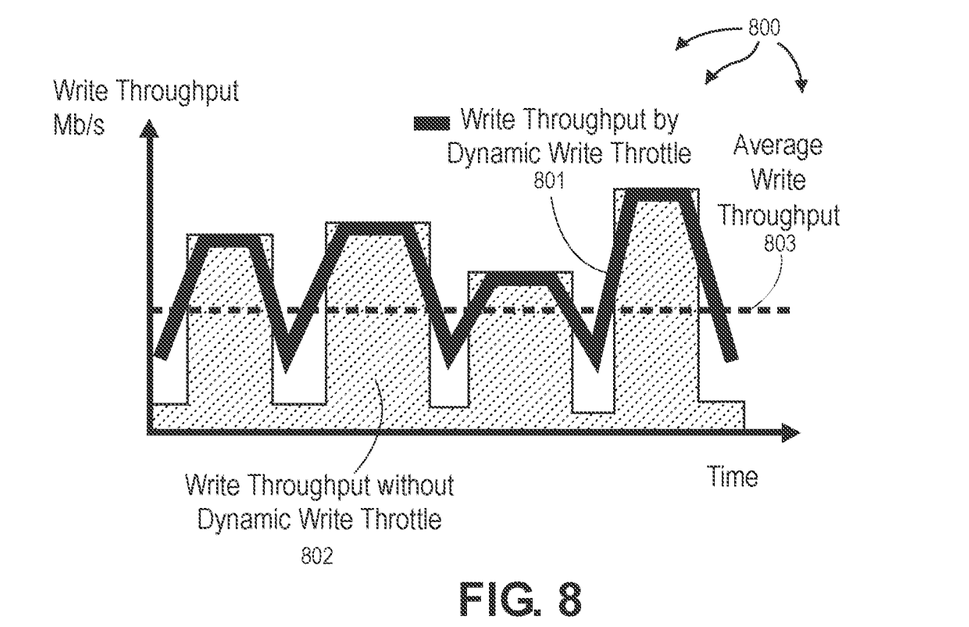
FIG. 8 illustrates an example graph of write throughput variation with and without dynamic write throttle.

Turing to FIG. 8, FIG. 8 illustrates an example graph 800 of write throughput variation with and without dynamic write throttle. Graph 800 includes write throughput with dynamic write throttle 801 and write throughput without dynamic write throttle 802. 801 depicts reduced magnitudes and shortened periods of latency and throughput slowing relative to 802, while essentially maintaining average write throughput 803.

Moving to FIGS. 1-5, FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices or cloud and DevOps tools, such as a mobile telephone or other mobile device, a desktop computer, a notebook computer, a server computer, a handheld computer, tablet computer and the like.

Figure 1:
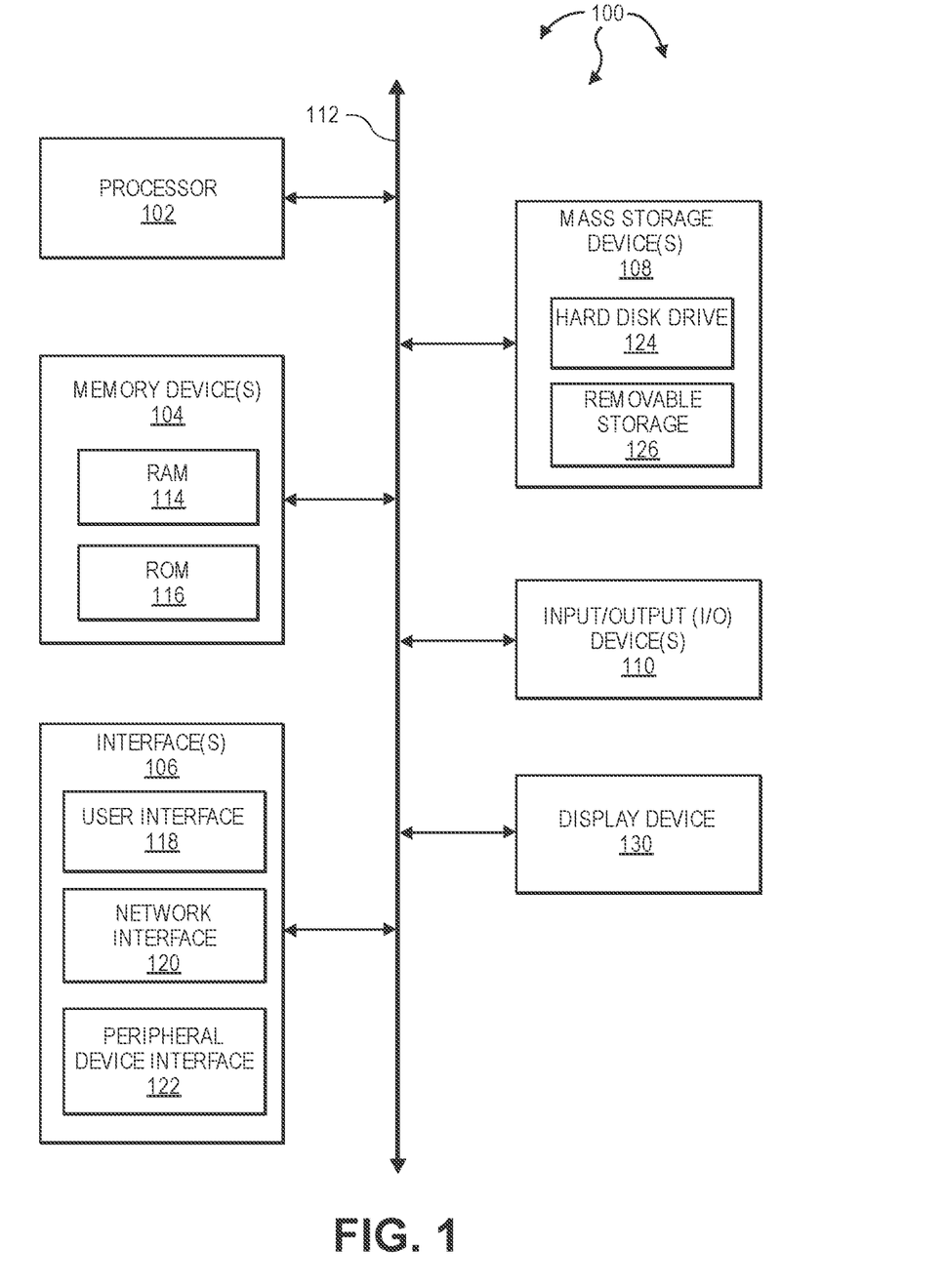
FIG. 1 illustrates an example block diagram of a computing device.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory. Processor(s) 102 can be real or virtual and can be allocated from on-premise, cloud computing or any cloud provider.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory. Memory device(s) 104 can be real or virtual and can be allocated from on-premise, cloud computing or any cloud provider.

Mass storage device(s) 108 include various computer storage media, such as magnetic tapes, magnetic disks, optical disks, solid state memory/drives (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media. Mass storage device(s) 108 can be real or virtual and can be allocated from on-premise, cloud computing or any cloud provider. Any of SSDs 202, 402, 601, 701, or 901 can be included in Mass storage device(s) 108.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like. I/O device(s) 110 can be real or virtual and can be allocated from on-premise, cloud computing or any cloud provider.

Display device 130 includes any type of device capable of displaying information to one or more users of computing device 100. Examples of display device 130 include a monitor, display terminal, video projection device, and the like. Display device 130 can be real or virtual and can be allocated from on-premise, cloud computing or any cloud provider.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122 (e.g., an interface to an SSD). Interface(s) 106 can be real or virtual and can be allocated from on-premise, cloud computing or any cloud provider.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth. Bus 112 can be real or virtual and can be allocated from on-premise, cloud computing or any cloud provider. Any of a variety of protocols can be implemented over bus 112, including but not limited to: NVMe, SATA, SCSI, etc. protocols.

Figure 2:
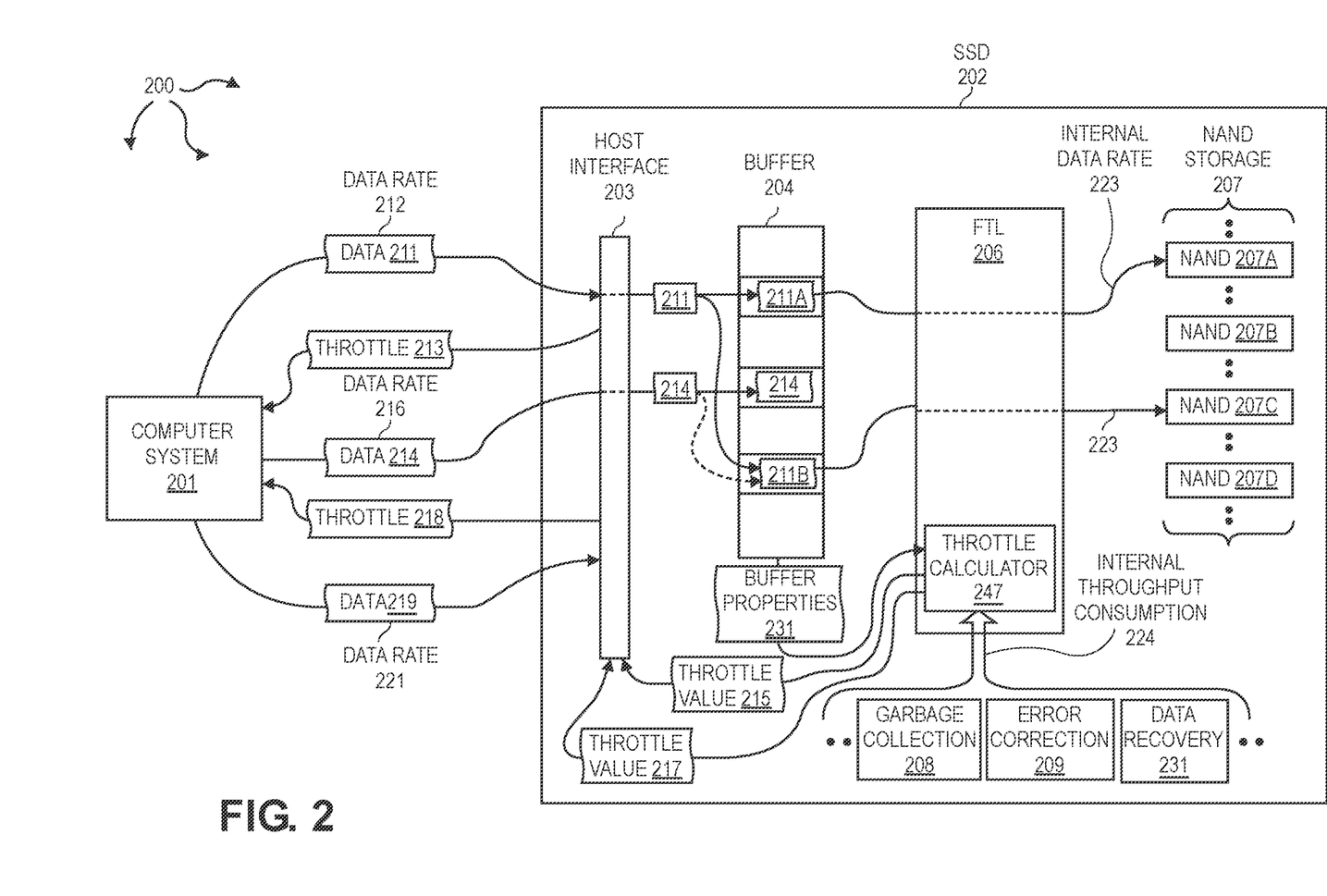
FIG. 2 illustrates an example computer architecture that facilitates dynamically throttling a host write data rate.

FIG. 2 illustrates an example computer architecture 200 that facilitates dynamically throttling a host write data rate. As depicted, computer architecture 200 includes computer system 201 and SSD 202. SSD 202 further includes host interface 203, buffer 204, FTL 206, NAND storage 207, garbage collection 208, error correction 209, and data recovery 231. SSD 202 can also include other modules, such as, encryption/decryption, defect management, etc.

In general, host interface 203 can receive host write data from computer system 201 (via a system bus, such as, bus112) and store received host write data in buffer 204 (e.g., RAM). Host interface 203 can also send write data throttles to computer system 201 to regulate the data rate used to send host write data to SSD 202. Buffer 204 can temporarily buffer received host write data prior to more durable storage at NAND storage 207. FTL 206 can transfer host write data from buffer 204 to NAND storage 207. NAND storage 207 can include NAND dies 207A, 207B, 207C, 207D, etc.

FTL 206 includes throttle calculator 247. Throttle calculator 247 can calculate throttle values for throttling a data rate of host write data. Throttle calculator 247 can calculate a throttle value based on throttle data including one or more of and/or relationships between one or more of: host data rate being used by computer system 201, an internal data rate being used to transfer host write data form buffer 204 to NAND storage 207, the total capacity of buffer 204, remaining portions of received host write data in buffer 204, amount of additional write data to be received, or internal throughput consumption by other components (e.g., garbage collection 208, error correction 209, data recovery 231, etc.). In one aspect, throttle calculator 247 calculates a throttle value from a combination throttle data, such as, for example, a ratio of an internal data rate to host write data rate.

FTL 206 can send calculated throttle values to host interface 203. Host interface 203 can convert the throttle values to corresponding write data throttles.

Figure 3:
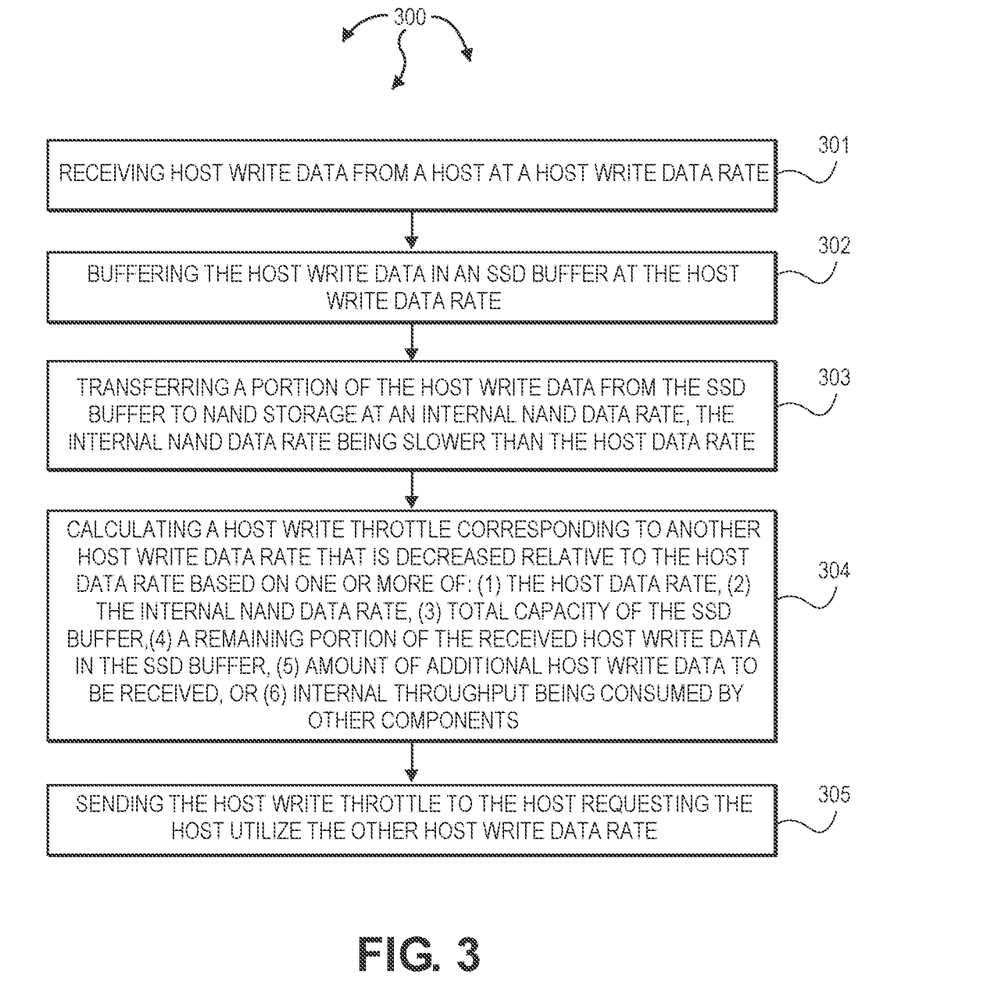
FIG. 3 illustrates a flow chart of an example method for dynamically throttling a host write data rate.

FIG. 3 illustrates a flow chart of an example method 300 for dynamically throttling a host write data rate. Method 300 will be described with respect to the components and data in computer architecture 200.

Method 300 includes receiving host write data from a host at a host write data rate (301). For example, SSD 202 can receive data 211 from computer system 201 at data rate 212. Method 300 includes buffering the host write data in an SSD buffer at the host write data rate (302). For example, host interface 203 can buffer write data 211 to buffer 204 at data rate 212. Host interface 203 can buffer write data 211 to different locations in buffer 204. For example, host interface 203 can split write data 211 into write data 211A and write data 211B buffered in different locations in buffer 204.

Method 300 includes transferring a portion of the host write data from the SSD buffer to NAND storage at an internal NAND data rate (303). For example, FTL 206 can transfer write data 211A from buffer 204 to NAND 207A at internal data rate 223. In one aspect, internal data rate 223 is less (i.e., data is sent slower) than data rate 212.

Method 300 includes calculating a host write throttle corresponding to another host write data rate based on (e.g., relationships between) one or more of: (1) the host data rate, (2) the internal NAND data rate, (3) total capacity of the SSD buffer, (4) a remaining portion of the received host write data in the SSD buffer, (5) amount of additional host write data to be received, or (6) internal throughput being consumed by other components (304). For example, throttle calculator 247 can calculate throttle value 215 based on one or more of and/or relationships between one or more of: data rate 212, internal data rate 223, total capacity of buffer 204, remaining portion of write data 211 in buffer 204, amount of additional host data to be received (e.g., from computer system 201) at SSD 202, or internal throughput consumption 224.

In one aspect, throttle calculator 247 calculates throttle value 215 from a ratio of internal data rate 223 to data rate 212.

In another aspect, throttle calculator 247 accesses buffer properties 231 associated with buffer 204. Buffer properties 231 can indicate properties of buffer 204 including total capacity, remaining capacity, data stored at buffer 204, etc.

It may be that FTL 206 predicts that buffer 204 is to become full based on buffer properties 231 and other data. Buffer 204 approaching capacity can trigger throttle value (re)calculation. FTL 206 can use throttle data (e.g., as indicated in or similar to 304) to predict buffer 204 approaching capacity.

Throttle calculator 247 (or some other monitoring component at FTL 206) can monitor internal throughput consumed by garbage collection 208, error correction 209, data recovery 231, and other back-end processes of SSD 202. Throttle calculator 247 (or the other monitoring component) can aggregate internal throughput consumption of individual processes into internal throughput consumption 224. Internal throughput consumption 224 can change over time as throughput consumption at each of: garbage collection 208, error correction 208, data recovery 231, and other back-end processes changes.

Throttle calculator 247 can send throttle value 215 to host interface 203. Host interface can derive throttle 213 from throttle value 215. Throttle 213 can define data rate 216. In one aspect, data rate 216 is less (i.e., data is to be sent slower) than data rate 212. Data rate 216 may also be less than internal data rate 223.

Method 300 includes sending the host write throttle to the host requesting the host utilize the other host write data rate (305). For example, host interface 203 can send throttle 213 to computer system 201. Throttle 213 can instruct/request computer system 201 to send additional host write data at data rate 216 (i.e., reduce the speed of transferring host write data) to SSD 202.

Subsequent to receiving throttle 213 from SSD 202, computer system 201 can send write data 214 to SSD 202 at data rate 216. Host interface 203 can receive write data 214 and buffer write data 214 in buffer 204 at data rate 216. Host interface 203 can buffer write data 214 in a location different that portions of write data 211. FTL 206 can also continue to transfer host write data from buffer 204 to NAND storage 207 at internal data rate 223 (or an updated internal data rate based on changes to internal throughput consumption 224). For example, FTL 206 can transfer data 211B to NAND 207C. As such, alternately, host interface 203 can buffer data 214 in a location previously occupied by a portion of data 211. For example, as indicated by the dashed line, host interface 203 can buffer data 214 in location previously occupied by write data 211B.

When data rate 216 is a reduced data rate relative to data rate 212 (and possibly also reduced relative to internal data rate 223), FTL is given time to "catch up" transferring host write data from buffer 204 to NAND storage 207. For example, FTL 206 can complete transfer of data 211 from buffer 204 to NAND storage 207 at internal data rate 223 prior to buffer 204 becoming full.

FTL 206 can predict buffer 204 is to include available capacity after data 211 is completely transferred to NAND storage 207. Predicted available capacity can be based on buffer properties 231 (that may change over time as data is written to and read form buffer 204) and other data. Buffer 204 having available capacity can trigger throttle value (re)calculation. For example, throttle calculator 247 can calculate throttle value 217 based on one or more of and/or relationships between one or more of: data rate 216, internal data rate 223, total capacity of buffer 204, remaining portion of write data 214 in buffer 204, amount of additional host data to be received (e.g., from computer system 201) at SSD 202, or internal throughput consumption 224. In one aspect, throttle calculator 247 (re)calculates throttle value 217 from a ratio of internal data rate 223 (or an updated internal data rate) to data rate 216.

Throttle calculator 247 can send throttle value 217 to host interface 203. Host interface 203 can derive throttle 218 from throttle value 217. Throttle 218 can define data rate 221. In one aspect, data rate 221 is greater (i.e., data is to be sent faster) than data rate 216. Data rate 221 may also be greater than internal data rate 223. In another aspect, data rate 216 is less (i.e., data is to be sent slower) than data rate 216.

Host interface 203 can send throttle 218 to computer system 201. Throttle 218 can instruct/request computer system 201 to send additional host write data at data rate 221 (i.e., increasing or decreasing the speed of transferring host write data) to SSD 202.

Subsequent to receiving throttle 218 from SSD 202, computer system 201 can send write data 219 to SSD 202 at data rate 221. Host interface 203 can receive write data 219 and buffer write data 219 in buffer 204 at data rate 221. FTL 206 can also continue to transfer host write data from buffer 204 to NAND storage 207 at internal data rate 223 (or an updated internal data rate). For example, FTL 206 can transfer data 214 to NAND storage 207.

When appropriate, throttle calculator 247 can again (re)calculate a throttle value and send the throttle value to host interface 203. Host interface 203 can derive a corresponding throttle (e.g., decreasing or increasing a current host write data rate). Within computer architecture 200, host write throttles can be derived and changed on an ongoing basis to approximate a specified write QoS.

Figure 4:
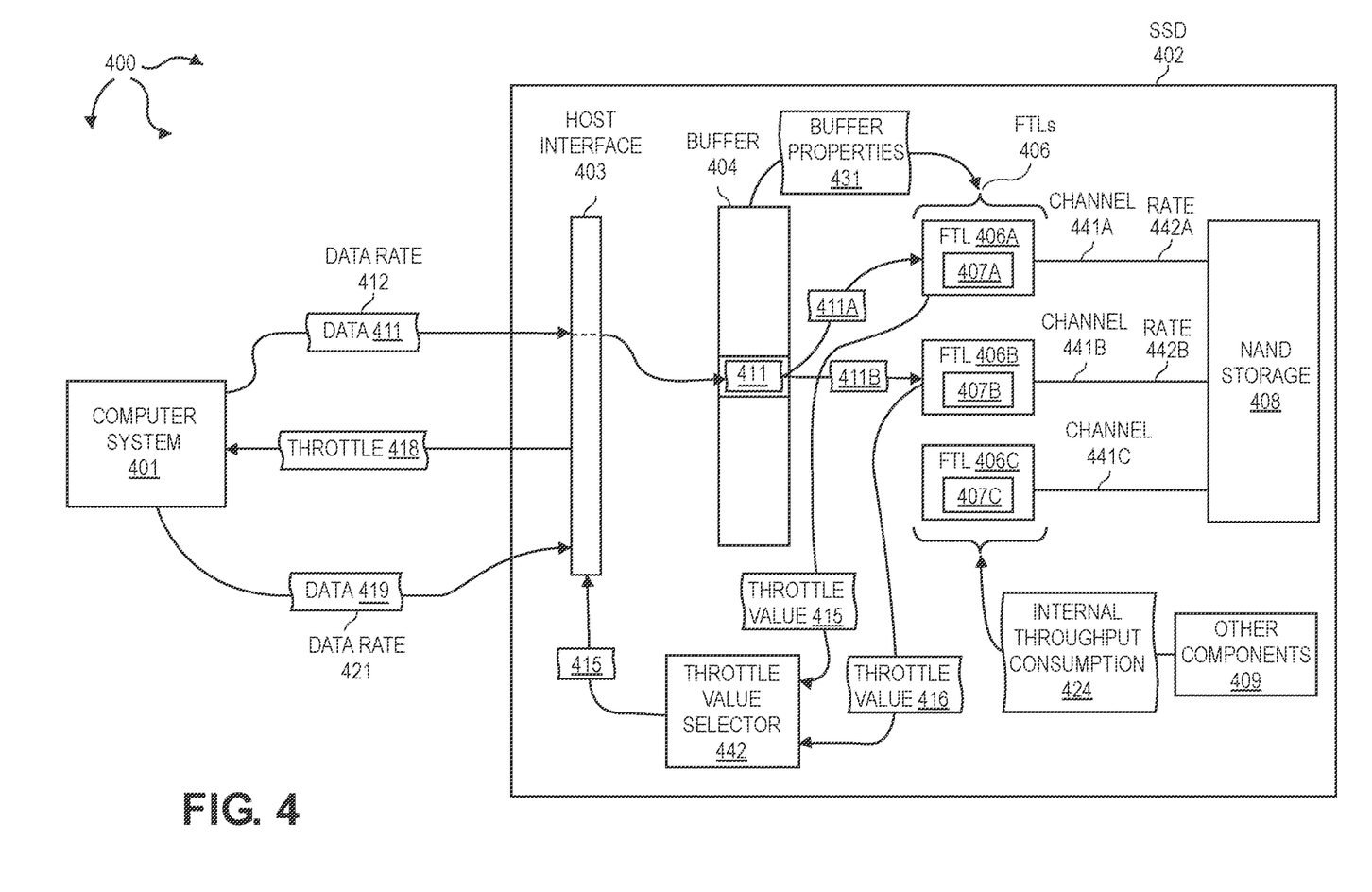
FIG. 4 illustrates another example computer architecture that facilitates dynamically throttling a host write data rate.

FIG. 4 illustrates another example computer architecture 400 that facilitates dynamically throttling a host write data rate. As depicted, computer architecture 200 includes computer system 401 and SSD 402. SSD 402 further includes host interface 403, buffer 404, FTLs 406, channels 441, NAND storage 408, other components 409 (e.g., garbage collection, error correction, data recovery, encryption/decryption, defect management, etc.), and throttle value selector 442.

In general, host interface 403 can receive host write data from computer system 401 (via a system bus, such as, bus 112) and store received host write data in buffer 404 (e.g., RAM). Host interface 403 can also send write data throttles to computer system 401 to regulate the data rate used to send host write data to SSD 402. Buffer 404 can temporarily buffer received host write data prior to more durable storage at NAND storage 408. NAND storage 408 can include a plurality of NAND dies.

FTLs 406 can transfer different portions of host write data from buffer 404 to NAND storage in parallel. Each of FTLs 206 can transfer data over a corresponding channel 441. For example, FTL 406A can transfer write data over channel 441A, FTL 406B can transfer write data over channel 441B, FTL 406C can transfer write data over channel 441C, etc. Each FTLs 206 also includes a corresponding throttle calculator 407. For example, FTL 406A incudes throttle calculator 407A, FTL 406B incudes throttle calculator 407B, FTL 406C incudes throttle calculator 407C, etc.

Each FTL 406 can transfer varied write data from buffer 404 to NAND storage 408 under different transfer conditions. As such, internal transfer rates can differ between channels 441 for parallel transferred write data. Each throttle calculator 407 can calculate a corresponding throttle value for throttling host write data.

Each throttle calculator 407 can calculate a throttle value based on throttle data including one or more of and/or relationships between one or more of: host data rate being used by computer system 401, an internal data rate being used to transfer host write data form buffer 404 to NAND storage 408 over the corresponding channel 441, the total capacity of the portion of buffer 404 associated with the corresponding FTL 406, remaining portions of received host write data in the portion of buffer 404 associated with the corresponding FTL 406, amount of additional write data to be received, or internal throughput consumption by other components 409. In one aspect, each throttle calculator 407 calculates a throttle value from a combination throttle data, such as, for example, a ratio of an internal data rate of a corresponding channel 441 to host write data rate.

Each FTL 406 can send a corresponding calculated throttle value to throttle value selector 442. Throttle value selector 442 can select a throttle value from among received throttle values. In one aspect, the selected throttle value corresponds to the most significant throttling of host write data (i.e., would slow the host write data rate the most). Throttle value selector 442 can send the selected throttle value to host interface 403. Host interface 203 can convert the selected throttle value to a corresponding write data throttle.

Figure 5:
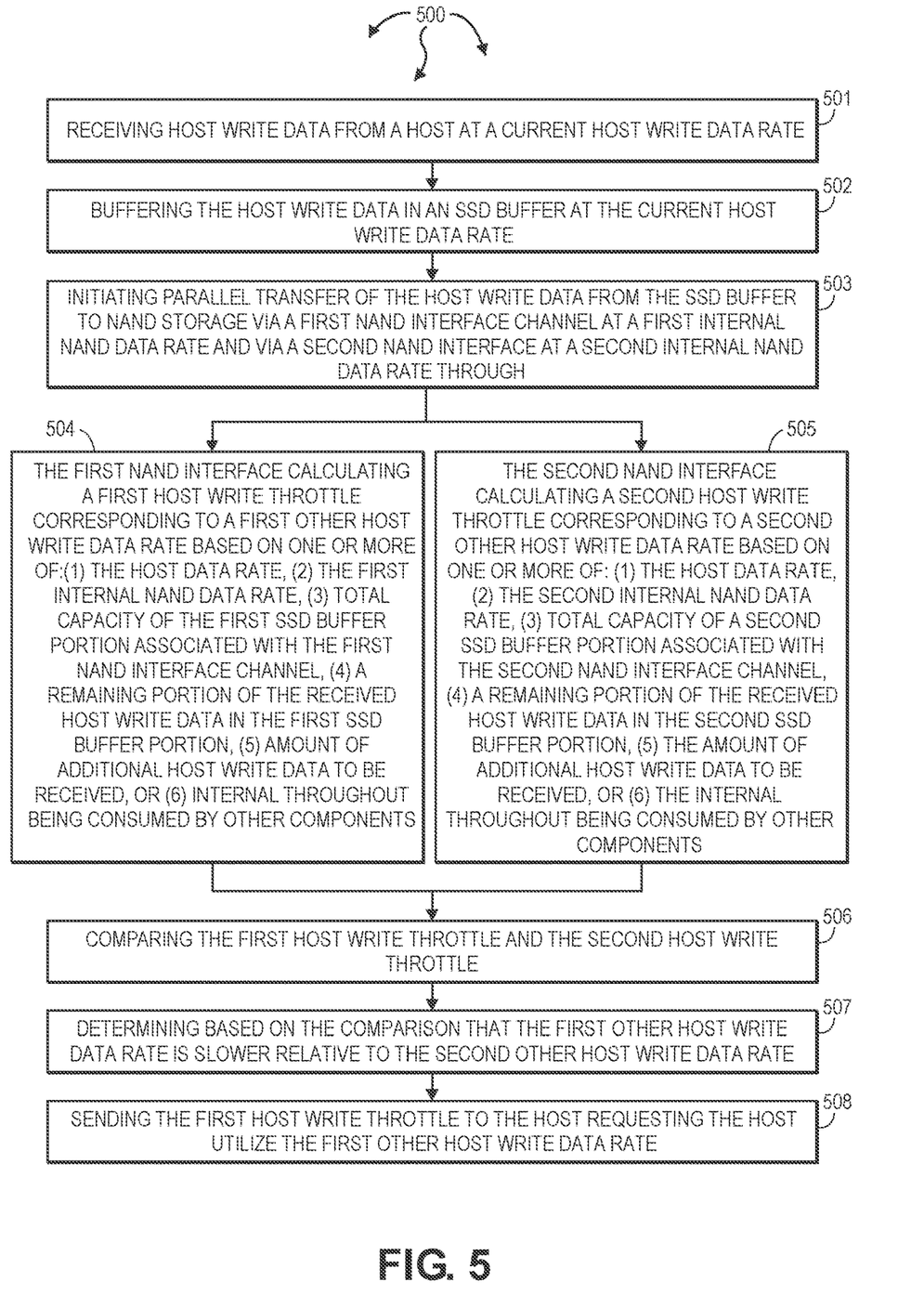
FIG. 5 illustrates a flow chart of an example method for dynamically throttling a host write data rate.

FIG. 5 illustrates a flow chart of an example method 500 for dynamically throttling a host write data rate. Method 500 will be described with respect to the components and data in computer architecture 400.

Method 500 includes receiving host write data from a host at a current host write data rate (501). For example, SSD 402 can receive data 411 from computer system 401 at data rate 412. Method 500 includes buffering the host write data in an SSD buffer at the current host write data rate (502). For example, host interface 403 can buffer write data 411 to buffer 404 at data rate 412. Host interface 403 may buffer write data 411 to different locations in buffer 404.

Method 500 includes initiating parallel transfer of the host write data from the SSD buffer to NAND storage via a first NAND interface channel at a first internal NAND data rate and via a second NAND interface channel at a second internal NAND data rate (503). For example, FTL 406A can initiate transfer of write data 411A (a portion of write data 411) to NAND storage 408 via channel 441A at internal data rate 442A. In parallel, FTL 406B can initiate transfer of write data 411B (another portion of write data 411) to NAND storage 408 via channel 441B at internal data rate 442B.

Method 500 includes the first NAND interface calculating a first host write throttle corresponding to a first other host write data rate based on one or more of: (1) the host data rate, (2) the first internal NAND data rate, (3) total capacity of a first SSD buffer portion associated with the first NAND interface channel, (4) a remaining portion of the received host write data in the first SSD buffer portion, (5) amount of additional host write data to be received, or (6) internal throughput being consumed by other components (504). For example, throttle calculator 407A can calculate throttle value 415 based on one or more of and/or relationships between one or more of: data rate 512, internal data rate 442A, total capacity of a portion of buffer 404 associated with FTL 406A, remaining portion of write data 411 in the portion of the buffer 404 associated with FTL 406A, amount of additional host data to be received (e.g., from computer system 401) at SSD 402, or internal throughput consumption 424.

In one aspect, throttle calculator 407A calculates throttle value 415 from a ratio of internal data rate 442A to data rate 412.

In another aspect, throttle calculator 407A accesses buffer properties 431 associated with buffer 404. Buffer properties 431 can indicate properties of buffer 404 including total capacity associated with FTL 406A, remaining capacity associated with FTL 406A, data stored at buffer 404, etc.

It may be that FTL 406A predicts that buffer 404 capacity associated with FTL 406A is to become full based on buffer properties 431 and other data. Buffer 404 capacity associated with FTL 406A approaching capacity can trigger throttle value (re)calculation. FTL 406A can use throttle data (e.g., as indicated in or similar to 504) to predict associated capacity of buffer 204 approaching capacity.

Throttle calculator 407A (or some other monitoring component at FTL 406A) can monitor internal throughput consumed by other components 409 (e.g., garbage collection, error correction, data recovery, etc.) and other back-end processes of SSD 402. Throttle calculator 407A (or the other monitoring component) can aggregate internal throughput consumption of individual processes into internal throughput consumption 424. Internal throughput consumption 424 can change over time as throughput consumption at other components 409 and other back-processes changes.

Throttle calculator 407A can send throttle value 415 to throttle value selector 442.

Method 500 includes the second NAND interface calculating a second host write throttle corresponding to a second other host write data rate based on one or more of: (1) the host data rate, (2) the second internal NAND data rate, (3) total capacity of a second SSD buffer portion associated with the second NAND interface channel, (4) a remaining portion of the received host write data in the second SSD buffer portion, (5) the amount of additional host write data to be received, or (6) the internal throughput being consumed by other components (505). For example, throttle calculator 407B can calculate throttle value 416 based on one or more of and/or relationships between one or more of: data rate 512, internal data rate 442B, total capacity of a portion of buffer 404 associated with FTL 406B, remaining portion of write data 411 in the portion of the buffer 404 associated with FTL 406B, amount of additional host data to be received (e.g., from computer system 401) at SSD 402, or internal throughput consumption 424.

In one aspect, throttle calculator 407B calculates throttle value 461 from a ratio of internal data rate 442B to data rate 412.

In another aspect, throttle calculator 407B accesses buffer properties 431 associated with buffer 404. Buffer properties 431 can indicate properties of buffer 404 including total capacity associated with FTL 406B, remaining capacity associated with FTL 406B, data stored at buffer 404, etc.

It may be that FTL 406B predicts that buffer 404 capacity associated with FTL 406B is to become full based on buffer properties 431 and other data. Buffer 404 capacity associated with FTL 406B approaching capacity can trigger throttle value (re)calculation. FTL 406B can use throttle data (e.g., as indicated in or similar to 505) to predict associated capacity of buffer 204 approaching capacity.

Throttle calculator 407B (or some other monitoring component at FTL 406B) can monitor internal throughput consumed by other components 409 (e.g., garbage collection, error correction, data recovery, etc.) and other back-end processes of SSD 402. Throttle calculator 407B (or the other monitoring component) can aggregate internal throughput consumption of individual processes into internal throughput consumption 424. Internal throughput consumption 424 can change over time as throughput consumption at other components 409 and other back-processes changes.

Throttle calculator 407B can send throttle value 416 to throttle value selector 442.

Throttle calculator 407C (as well as throttle calculators at any other FTLs 406) can calculate additional throttle values in manners similar to 504 and 505. Throttle calculator 407C (as well as any other throttle calculators) can send calculated throttle values to throttle value selector 442.

Method 500 includes comparing the first host write throttle and the second host write throttle (506). For example, throttle value selector 442 can receive throttle value 415 from FTL 406A and can receive throttle value 416 from FTL 406B. Throttle value selector 442 can possibly also receive one or more other throttle values from FTL 406C, etc. Throttle value selector 442 can compare throttle value 415 and throttle value 416 (and, when appropriate, any other throttle values) to one another.

Method 500 includes determining based on the comparison that the first other host write data rate is slower than the second other host write data rate (507). For example, throttle value selector 442 can determine that throttle value 215 corresponds to data rate 421 and that throttle value 216 corresponds to a second host data. When appropriate, throttle value selector 442 can determine that any other throttle values correspond to other host write data rates. Throttle value selector 442 can determine that data rate 421 is slower than the second host data rate (and, when appropriate, also slower than any other host write data writes).

Throttle value selector 442 can send throttle value 545 to host interface 203. Host interface can derive throttle 418 from throttle value 415. Throttle 418 can define data rate 421. In one aspect, data rate 216 is less (i.e., data is to be sent slower) than data rate 412. Data rate 421 may also be less than internal data rates 442A, 442B, etc.

Method 500 includes sending the first host write throttle to the host requesting the host utilize the first other host write data rate (508). For example, host interface 403 can send throttle 418 to computer system 401. Throttle 418 can instruct/request computer system 401 to send additional host write data at data rate 421 (i.e., reduce the speed of transferring host write data) to SSD 402.

Subsequent to receiving throttle 418 from SSD 402, computer system 401 can send write data 419 to SSD 402 at data rate 421. Host interface 203 can receive write data 419 and buffer write data 419 in buffer 404 at data rate 421. Host interface 403 can buffer write data 419 in a location different that portions of write data 411. FTLs 406 can also continue to transfer host write data in parallel from buffer 404 to NAND storage 408 at corresponding internal data rates, such as, rate 442A, 442B, etc. (or updated internal data rates based on changes to internal throughput consumption 424).

When data rate 421 is a reduced data rate relative to data rate 412 (and possibly also reduced relative to internal data rates 442A, 442B, etc.), individual FTLs 406 are given time to "catch up" transferring host write data from buffer 404 to NAND storage 408. For example, FTLs 406 can complete transfer of data 411 from buffer 404 to NAND storage 408 at internal data rates 441A, 441B, etc. prior to buffer 404 becoming full.

FTLs 406 can predict corresponding portions of buffer 404 are to include available capacity after data 411 is completely transferred to NAND storage 408. Predicted available capacity can be based on buffer properties 431 (that may change over time as data is written to and read form buffer 404) and other data. Portions of buffer 404 having available capacity can trigger throttle value (re)calculation. For example, throttle calculators 407A, 407B, 407C, etc. can (re)calculate new throttle values based on one or more of: data rate 421, corresponding internal data rates, total capacity at corresponding portions of buffer 404, remaining portions of write data 419 in corresponding portions of buffer 404, amount of additional host data to be received (e.g., from computer system 401) at SSD 242, or internal throughput consumption 424.

In one aspect, throttle calculators 407A, 407B, 407C, etc. (re)calculate new throttle values from a ratio of corresponding internal data rates (or updated internal data rates) on channels 441, 441B, 441C, etc. to data rate 216. Throttle calculators 407A, 407B, 407C, etc. can (re)calculate new throttle values periodically, at specific times, when available back-end throughput changes, etc. Throttle calculators 407A, 407B, 407C, etc. can (re)calculate new throttle values in combination with and/or different form another. That is, throttle calculators 407A, 407B, 407C, etc. can (re)calculate new throttle values at different times.

Throttle calculators 407A, 407B, 407C, etc. can send new throttle values to throttle value selector 442. Throttle value selector 442 can compare new throttle values and/or existing throttle values to one another. Throttle value selector 442 can maintain a cache of received throttle values per FTL 406 to facilitate ongoing comparisons (e.g., when different throttle calculators 407 (re)calculate throttle values at different times). Throttle value selector 442 can select a throttle value corresponding to a new slowest write data rate.

Throttle value selector can send the selected throttle value to host interface 403. In one aspect, a new slowest write data rate is greater (i.e., data is to be sent faster) than data rate 421. The new slowest write data rate may also be greater than one or more of internal data rates 442A, 442B, etc. In another aspect, a new slowest write data rate is less (i.e., data is to be sent slower) than data rate 421.

Host interface 403 can send a new throttle to computer system 401. The new throttle can instruct/request computer system 401 to send additional host write data at the new slowest writ data rate (i.e., increasing or decreasing the speed of transferring host write data) to SSD 402.

Subsequent to receiving the new throttle from SSD 402, computer system 401 can send additional write data to SSD 402 at the new slowest write data rate. Host interface 203 can receive the additional write data and buffer the additional write data in buffer 404 at the new slowest write data rate. FTLs 206 can also continue to transfer host write data in parallel from buffer 404 to NAND storage 408 at corresponding internal data rates (which may be updated internal data rates).

When appropriate, throttle calculators 407A, 407B, 407C, etc. can again (re)calculate a throttle values and send the throttle values to throttle value selector 442. Throttle value selector can select an appropriate throttle value and send the appropriate throttle value to host interface 403. Host interface 403 can derive a corresponding throttle (e.g., decreasing or increasing a current host write data rate). Within computer architecture 400, host write throttles can be derived and changed on an ongoing basis to approximate a specified write QoS.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives (SSDs) (e.g., RAM-based or Flash-based), Shingled Magnetic Recording (SMR) devices, storage class memory (SCM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: host write data rates, host write data, throttles, buffer properties, throttle values, internal throughput consumptions, internal data rates, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, host write data rates, host write data, throttles, buffer properties, throttle values, internal throughput consumptions, internal data rates, etc.

Implementations of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as on premise, private cloud, community cloud, public cloud, hybrid cloud, and so forth. In this description and in the following claims, a "cloud computing environment" is an environment in which cloud computing is employed.

Hybrid cloud deployment models combine portions of other different deployment models, such as, for example, a combination of on premise and public, a combination of private and public, a combination of two different public cloud deployment models, etc. Thus, resources utilized in a hybrid cloud can span different locations, including on premise, private clouds, (e.g., multiple different) public clouds, etc.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
receiving host write data from a host at a host data rate;
buffering the host write data in an SSD buffer at the host data rate;
transferring a portion of the host write data from the SSD buffer to NAND storage at an internal NAND data rate;
predicting that the SSD buffer is to become full prior to completely transferring the host write data to the NAND storage and prior to calculating a host write throttle corresponding to another host data rate;
calculating the host write throttle corresponding to the other host data rate based on: (1) the host data rate, (2) the internal NAND data rate, (3) total capacity of the SSD buffer, and (4) a remaining portion of the received host write data in the SSD buffer; and
sending the host write throttle to the host requesting the host utilize the other host data rate.

2. The method of claim 1, wherein transferring a portion of the host write data from the SSD buffer to NAND storage at an internal NAND data rate comprises transferring the host write data at an internal NAND data rate that is less than the host data rate.

3. The method of claim 1, wherein calculating the host write throttle comprises calculating the host write throttle that is decreased relative to the host data rate.

4. The method of claim 1, further comprising:
receiving additional host write data from the host at the other host data rate;
continuing transfer of the host write data from the SSD buffer to the NAND storage at the internal NAND transfer rate, including transferring the remaining portion of the host write data from an SSD buffer location to the NAND storage;

buffering the additional host write data in the SSD buffer at the other host data rate during continued transfer of the host write data to the NAND storage; and completing transfer of the host write data from the SSD buffer to the NAND storage at the internal NAND transfer rate prior to the SSD buffer becoming full.

5. The method of claim 4, further comprising:

predicting that the SSD buffer is to include available capacity subsequent to completing transfer of the host write data to the NAND storage based on: (1) the total capacity of the SSD buffer, (2) further host write data to be received at the other host data rate, and (3) the internal NAND data rate;

calculating a further host write throttle corresponding to a further host data rate that is increased relative to the other host data rate;

sending the further host write throttle to the host requesting the host utilize the further host data rate.

6. The method of claim 1 wherein, calculating the host write throttle comprises calculating the host write throttle based on internal throughput being consumed by other components.

7. The method of claim 1, wherein receiving host write data from a host at a host data rate comprises receiving host data via a protocol selected from among: NVMe, SATA, or SCSI.

8. A method comprising:

receiving host write data from a host at a current host data rate;

buffering the host write data in an SSD buffer at the current host data rate;

initiating parallel transfer of the host write data from the SSD buffer to NAND storage via a first NAND interface channel at a first internal NAND data rate and via a second NAND interface channel at a second internal NAND data rate;

the first NAND interface calculating a first host write throttle value corresponding to first other host data rate based on: (1) total capacity of a first SSD buffer portion associated with the first NAND interface, (2) a remaining portion of the received host write data in the first SSD buffer portion, (3) additional host write data to be received at the current host data rate, and (4) the first internal NAND data rate;

the second NAND interface calculating a second host write throttle value corresponding to a second other host data rate based on: (1) total capacity of a second SSD buffer portion associated with the second NAND interface, (2) a remaining portion of the received host write data in the second SSD buffer portion, (3) additional host write data to be received at the current host data rate, and (4) the second internal NAND data rate;

comparing the first host write throttle value and the second host write throttle value;

determining based on the comparison that the first other host data rate is slower than the second other host data rate; and sending the first host write throttle to the host requesting the host utilize the first other host data rate.

9. The method of claim 8, wherein the first NAND interface calculating a first host write throttle value comprises calculating a ratio of the current host data rate to the first internal NAND data rate; and wherein the second NAND interface calculating a second host write throttle value comprises calculating another ratio of the current host data rate to the send internal NAND data rate.

10. The method of claim 8, wherein receiving host write data from a host at a current host data rate comprises receiving host data via a protocol selected from among: NVMe, SATA, or SCSI.

11. A system comprising:

a processor; and system memory coupled to the processor and storing instructions configured to cause the processor to:

receive host write data from a host at a host data rate;

buffer the host write data in an SSD buffer at the host data rate;

transfer a portion of the host write data from the SSD buffer to NAND storage at an internal NAND data rate;

predict that the SSD buffer is to become full prior to completely transferring the host write data to the NAND storage and prior to calculating a host write throttle corresponding to another host data rate;

calculate the host write throttle corresponding to the other host data rate based on: (1) the host data rate, (2) the internal NAND data rate, (3) total capacity of the SSD buffer, and (4) a remaining portion of the received host write data in the SSD buffer; and send the host write throttle to the host requesting the host utilize the other host data rate.

12. The computer system of claim 11, wherein instructions configured to transfer a portion of the host write data from the SSD buffer to NAND storage at an internal NAND data rate comprise instructions configured to transfer the host write data at an internal NAND data rate that is less than the host data rate.

13. The computer system of claim 11, wherein instructions configured to calculate the host write throttle comprise instructions configured to calculate the host write throttle that is decreased relative to the host data rate.

14. The system of claim 11, further comprising instructions configured to:

receive additional host write data from the host at the other host data rate;

continue transfer of the host write data from the SSD buffer to the NAND storage at the internal NAND transfer rate, including transferring the remaining portion of the host write data from an SSD buffer location to the NAND storage;

buffer the additional host write data in the SSD buffer at the other host data rate during continued transfer of the host write data to the NAND storage; and complete transfer of the host write data from the SSD buffer to the NAND storage at the internal NAND transfer rate prior to the SSD buffer becoming full.

15. The system of claim 14, further comprising instructions configured to:

predict that the SSD buffer is to include available capacity subsequent to completing transfer of the host write data to the NAND storage based on: (1) the total capacity of the SSD buffer, (2) further host write data to be received at the other host data rate, and (3) the internal NAND data rate;

calculate a further host write throttle corresponding to a further host data rate that is increased relative to the other host data rate;

send the further host write throttle to the host requesting the host utilize the further host data rate.

16. The system of claim 11, wherein instructions configured to calculate the host write throttle comprise instructions configured to calculate the host write throttle based on internal throughput being consumed by other components.

17. The system of claim 11, wherein instructions configured to receive host write data from a host at a host data rate comprises receiving host data via a protocol selected from among: NVMe, SATA, or SCSI.

18. The system of claim 11, wherein instructions configured to calculate the host write throttle comprise instructions configured to calculate a ratio of the host data rate to the internal NAND data rate.

19. A method comprising:
  receiving host write data from a host at a host data rate;
  buffering the host write data in an SSD buffer at the host data rate;
  transferring a portion of the host write data from the SSD buffer to NAND storage at an internal NAND data rate;
  calculating a host write throttle corresponding to another host data rate based on: (1) the host data rate, (2) the internal NAND data rate, (3) total capacity of the SSD buffer, (4) a remaining portion of the received host write data in the SSD buffer, and (5) internal throughput being consumed by other components; and
  sending the host write throttle to the host requesting the host utilize the other host data rate.

20. The method of claim 19, further comprising:
  receiving additional host write data from the host at the other host data rate;
  continuing transfer of the host write data from the SSD buffer to the NAND storage at the internal NAND transfer rate, including transferring the remaining portion of the host write data from an SSD buffer location to the NAND storage;
  buffering the additional host write data in the SSD buffer at the other host data rate during continued transfer of the host write data to the NAND storage; and
  completing transfer of the host write data from the SSD buffer to the NAND storage at the internal NAND transfer rate prior to the SSD buffer becoming full.

21. A system comprising:
  a processor; and
  system memory coupled to the processor and storing instructions configured to cause the processor to:
    receive host write data from a host at a host data rate;
    buffer the host write data in an SSD buffer at the host data rate;
    transfer a portion of the host write data from the SSD buffer to NAND storage at an internal NAND data rate;
    calculate a host write throttle corresponding to another host data rate based on: (1) the host data rate, (2) the internal NAND data rate, (3) total capacity of the SSD buffer, (4) a remaining portion of the received host write data in the SSD buffer, and (5) internal throughput being consumed by other components; and
    send the host write throttle to the host requesting the host utilize the other host data rate.

22. The computer system of claim 21, wherein instructions configured to transfer a portion of the host write data from the SSD buffer to NAND storage at an internal NAND data rate comprise instructions configured to transfer the host write data at an internal NAND data rate that is less than the host data rate.

* * * * *